(12) United States Patent
Saha et al.

(10) Patent No.: US 12,708,967 B2
(45) Date of Patent: Aug. 18, 2026

(54) SYSTEM AND METHOD OF REPAIRING A MULTI-LAYER COMPONENT OF AN ENGINE

(71) Applicant: General Electric Company, Schenectady, NY (US)

(72) Inventors: Atanu Saha, Bengaluru (IN); Hrishikesh Keshavan, Bengaluru (IN); Sanat Chandra Maiti, Bengaluru (IN); Scott Allen Jones, Durham, NC (US)

(73) Assignee: General Electric Company, Evendale, OH (US)

( * ) Notice: Subject to any disclaimer, the term of this patent is extended or adjusted under 35 U.S.C. 154(b) by 49 days.

(21) Appl. No.: 18/536,780

(22) Filed: Dec. 12, 2023

(65) Prior Publication Data

US 2025/0073829 A1 Mar. 6, 2025

(30) Foreign Application Priority Data

Aug. 31, 2023 (IN) ............................ 202311058478

(51) Int. Cl.
*B23P 6/00* (2006.01)
*F01D 11/00* (2006.01)

(52) U.S. Cl.
CPC .............. *B23P 6/007* (2013.01); *F01D 11/00* (2013.01); *F05D 2230/22* (2013.01); *F05D 2230/80* (2013.01)

(58) Field of Classification Search
CPC .............. B23P 6/007; B23P 6/04; B23P 6/045
See application file for complete search history.

(56) References Cited

U.S. PATENT DOCUMENTS 4,744,725 A 5/1988 Matarese et al.
5,935,407 A 8/1999 Nenov et al.
6,887,036 B2 5/2005 Ohara et al.
7,509,735 B2 * 3/2009 Philip .................... C23C 24/04 29/889.1
7,842,335 B2 11/2010 Skoog et al.
9,016,692 B2 4/2015 Haubold et al.
9,127,550 B2 * 9/2015 Hunt ...................... F01D 5/005
9,574,518 B2 * 2/2017 Moore .................... F02K 1/386
9,713,912 B2 7/2017 Lee
10,384,978 B2 8/2019 McEvoy et al.
10,738,644 B2 8/2020 Shi et al.
11,028,721 B2 6/2021 Seymour et al.
11,066,952 B2 * 7/2021 Hanlon .................. F01D 5/288
11,073,028 B2 7/2021 Strock et al.
11,486,263 B1 11/2022 Pabla et al.
11,549,382 B2 * 1/2023 Keshavan .......... C23C 28/3455
(Continued)

*Primary Examiner* — Sarang Afzali
(74) *Attorney, Agent, or Firm* — Dority & Manning, P.A.

(57) ABSTRACT

A method of repairing a multi-layer component of an engine in-module includes identifying a damage location on the multi-layer component. The damage location extends at least partially into a ceramic-based top layer of the multi-layer component. The method further includes depositing a material composition onto the damage location at a first temperature range so as to cover the damage location. The material composition includes one or more sintering additives. Further, the method includes applying localized curing to the material composition deposited at the damage location at a second temperature range, the second temperature range being higher than the first temperature range.

8 Claims, 5 Drawing Sheets

(56) References Cited

U.S. PATENT DOCUMENTS

| | | | | |
|---|---|---|---|---|
| 2003/0082297 | A1* | 5/2003 | Wolkers | C23C 4/18 427/404 |
| 2005/0035086 | A1 | 2/2005 | Chen et al. | |
| 2005/0228098 | A1 | 10/2005 | Skoog et al. | |
| 2006/0027308 | A1* | 2/2006 | Mackenzie | B29C 73/30 156/94 |
| 2021/0396181 | A1 | 12/2021 | Keshavan et al. | |

* cited by examiner 210
200
56

206
200
56
202

208
204
200
206
56
202

204
200
56
202

200
56
202

SYSTEM AND METHOD OF REPAIRING A MULTI-LAYER COMPONENT OF AN ENGINE

PRIORITY INFORMATION

The present application claims priority to Indian patent application Ser. No. 202311058478 filed on Aug. 31, 2023.

FIELD

The present disclosure relates generally to gas turbine engines and more particularly relates to a system and method of repairing a multi-layer component for an engine, such as seal teeth.

BACKGROUND

At least some gas turbine engines, such as turbofan engines, include a fan and a core engine to drive the fan. The core engine includes at least one compressor, a combustor, and a high-pressure turbine coupled together in a serial flow relationship. More specifically, the compressor and high-pressure turbine are coupled through a first drive shaft to form a high-pressure rotor assembly. Air entering the core engine is mixed with fuel and ignited to form a high energy gas stream. The high energy gas stream flows through the high-pressure turbine to rotatably drive the high-pressure turbine such that the first drive shaft rotatably drives the compressor. The gas stream expands as it flows through a low-pressure turbine positioned aft of the high-pressure turbine. The low-pressure turbine includes a rotor assembly coupled to a second drive shaft, which is coupled to the fan. The low-pressure turbine rotatably drives the fan through the second drive shaft.

Some turbines and compressors include multiple stages. Multistage turbines and compressors generally include inter-stage seals positioned between adjacent ones of the stages. An inter-stage seal prevents leakage of the gas compressed or expanded by the preceding stage. Specifically, an inter-stage seal may be located between two rotating disks for providing a fluid seal therebetween to prevent or limit leakages therethrough. Common inter-stage seals may have a generally ring-shaped configuration with a plurality of seal teeth positioned on the seal ring for preventing leaking between the stages. Aircraft engines having gas turbine engines may use similar designs.

Such inter-stage seals, however, may have issues with maintainability and reliability. For example, uneven temperature distributions during operation may result in relatively large tensile forces therein. In addition, during service, the top layer can suffer from spallation for multiple reasons. Once spallation occurs above a critical size during operation, the only option is to replace and repair the entire component by stripping and recoating. Thus, repairing the seal teeth can only be completed at the component level by dismantling the engine.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
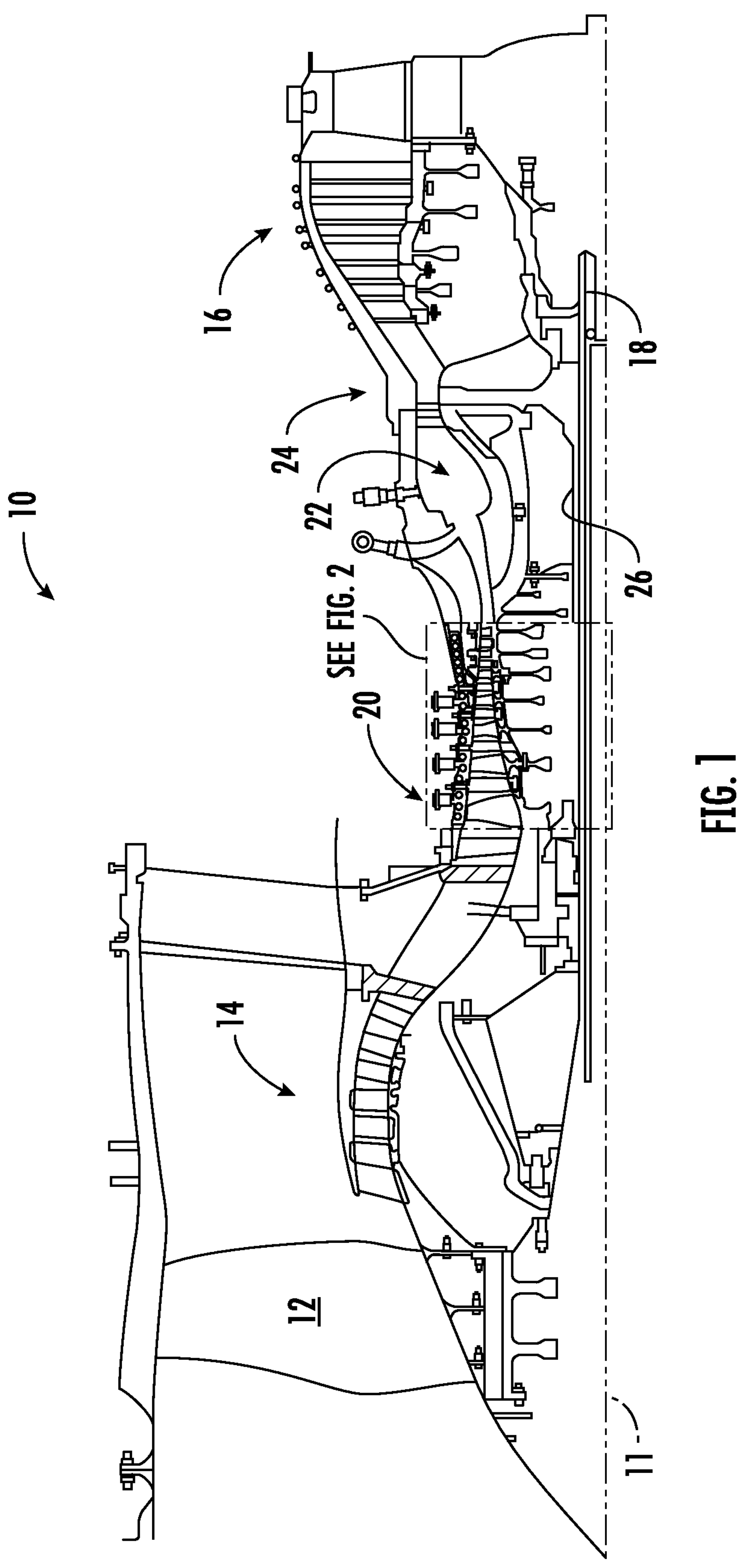
FIG. 1 is a schematic cross-sectional view of a gas turbine engine according to various embodiments of the present disclosure.

Reference now will be made in detail to embodiments of the present disclosure, one or more examples of which are illustrated in the drawings. Each example is provided by way of explanation of the present disclosure, not limitation of the present disclosure. In fact, it will be apparent to those skilled in the art that various modifications and variations can be made in the present disclosure without departing from the scope or spirit of the present disclosure. For instance, features illustrated or described as part of one embodiment can be used with another embodiment to yield a still further embodiment. Thus, it is intended that the present disclosure covers such modifications and variations as come within the scope of the appended claims and their equivalents.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a", "an", and "the" include plural references unless the context clearly dictates otherwise.

The term "at least one of" in the context of, e.g., "at least one of A, B, and C" refers to only A, only B, only C, or any combination of A, B, and C.

The term "turbomachine" refers to a machine including one or more compressors, a heat generating section (e.g., a combustion section), and one or more turbines that together generate a torque output.

The term "gas turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines.

The term "combustion section" refers to any heat addition system for a turbomachine. For example, the term combustion section may refer to a section including one or more of a deflagrative combustion assembly, a rotating detonation combustion assembly, a pulse detonation combustion assembly, or other appropriate heat addition assembly. In certain example embodiments, the combustion section may include an annular combustor, a can combustor, a cannular combustor, a trapped vortex combustor (TVC), or other appropriate combustion system, or combinations thereof.

As used herein, the term "rotor" refers to any component of a rotary machine, such as a turbine engine, that rotates about an axis of rotation. By way of example, a rotor may include a shaft or a spool of a rotary machine, such as a turbine engine.

As used herein, the term “stator” refers to any component of a rotary machine, such as a turbine engine, that has a coaxial configuration and arrangement with a rotor of the rotary machine. A stator may be disposed radially inward or radially outward along a radial axis in relation to at least a portion of a rotor. Additionally, or in the alternative, a stator may be disposed axially adjacent to at least a portion of a rotor.

The terms “low” and “high”, or their respective comparative degrees (e.g., -er, where applicable), when used with a compressor, a turbine, a shaft, or spool components, etc. each refer to relative speeds within an engine unless otherwise specified. For example, a “low turbine” or “low speed turbine” defines a component configured to operate at a rotational speed, such as a maximum allowable rotational speed, lower than a “high turbine” or “high speed turbine” of the engine.

The terms “forward” and “aft” refer to relative positions within a gas turbine engine or vehicle and refer to the normal operational attitude of the gas turbine engine or vehicle. For example, with regard to a gas turbine engine, forward refers to a position closer to an engine inlet and aft refers to a position closer to an engine nozzle or exhaust.

The terms “upstream” and “downstream” refer to the relative direction with respect to fluid flow in a fluid pathway. For example, “upstream” refers to the direction from which the fluid flows, and “downstream” refers to the direction to which the fluid flows.

As used herein, the terms “axial” and “axially” refer to directions and orientations that extend substantially parallel to a centerline of the gas turbine engine. Moreover, the terms “radial” and “radially” refer to directions and orientations that extend substantially perpendicular to the centerline of the gas turbine engine. In addition, as used herein, the terms “circumferential” and “circumferentially” refer to directions and orientations that extend arcuately about the centerline of the gas turbine engine.

The terms “coupled”, “fixed”, “attached to”, and the like refer to both direct coupling, fixing, or attaching, as well as indirect coupling, fixing, or attaching through one or more intermediate components or features, unless otherwise specified herein.

As used herein, the terms “first”, “second”, “third” and so on may be used interchangeably to distinguish one component from another and are not intended to signify location or importance of the individual components.

The term “adjacent” as used herein with reference to two walls and/or surfaces refers to the two walls and/or surfaces contacting one another, or the two walls and/or surfaces being separated only by one or more nonstructural layers and the two walls and/or surfaces and the one or more nonstructural layers being in a serial contact relationship (i.e., a first wall/surface contacting the one or more nonstructural layers, and the one or more nonstructural layers contacting the a second wall/surface).

Approximating language, as used herein throughout the specification and claims, is applied to modify any quantitative representation that could permissibly vary without resulting in a change in the basic function to which it is related. Accordingly, a value modified by a term or terms, such as “about”, “approximately”, and “substantially”, are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin. These approximating margins may apply to a single value, either or both endpoints defining numerical ranges, and/or the margin for ranges between endpoints.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Example aspects of the present disclosure are directed to systems and methods of repairing gas turbine engine components, such as seal teeth, using a unique material composition. As mentioned, multistage turbines and compressors generally include inter-stage seals positioned between each of the stages to prevent leakage of the gas compressed by the preceding stage. Specifically, an inter-stage seal may be located between two rotating disks for providing a fluid seal therebetween to prevent or limit leakages therethrough. Common inter-stage seals may have a generally ring-shaped configuration with a plurality of seal teeth positioned on the seal ring for preventing leaking between the leakage between the stages. The seal teeth typically have three layers, e.g., a base layer, an intermediate layer, and a ceramic-based top layer. The base layer is typically a nickel-based alloy or a titanium-based alloy. The intermediate layer is typically a nickel-aluminide bond coat layer. The ceramic-based top layer is commonly made of alumina. For certain seal teeth, the intermediate and ceramic-based top layers may be deposited onto the base layer using any suitable applications methods, such as via atmospheric plasma spraying (APS), additive manufacturing, etc.

During operation of the gas turbine engine, such inter-stage seals experience uneven temperature distributions, which may impact the integrity of the seals and/or the seal teeth. In addition, during service of the engine, the ceramic-based top layer can suffer from spallation due to multiple reasons, including but not limited to, fractures due to static contact loads during disassembly, Hastelloy metal transfer, and/or crack formation in the ceramic top layer during turning operation while making the component by original equipment manufacturer (OEM). As used herein, “spallation” generally refers to a process in which fragments of material break away from a body due to stress. Once spallation occurs above a critical size during operation, the only option is to replace and repair the entire component by stripping and recoating. Typically, the repair of seal teeth can only be completed at the component level by dismantling the engine.

Accordingly, the present disclosure is directed to a new material composition for repairing gas turbine engine components, such as seal teeth, and methods of using the material composition in-module (i.e., while the seal teeth are installed in the engine) and/or when the engine is disassembled. More specifically, the material composition of the present disclosure can be used to repair the ceramic-based top layer of a seal tooth at an in-module level. In an embodiment, methods of the present disclosure may include depositing a repair coating layer of the material composition, e.g., by spackling or slurry spraying, at room temperature followed by curing with localized heat treatment. In an embodiment, wherein the localized curing is completed at the module level, the curing temperature is lower to protect the underlying base layer.

Thus, in an embodiment, the material composition of the present disclosure is a slurry composition that can be applied to a damage location of an alumina-based ceramic-based top layer of a damaged seal tooth, such that the seal tooth can be repaired via sintering at lower temperatures, such as from about 300 degrees Celsius (° C.) to about 900 (° C.), such as less than about 650° C. In certain embodiments, the slurry composition may include one or more sintering additions (such as low melting glass) and a nucleating agent to convert the glass to ceramic, thereby eliminating coating brittleness. Moreover, in an embodiment, the graded architecture (e.g., where a relative amount of alumna and sintering aids vary across the thickness (from intermediate layer to top surface) of the top ceramic layer) is configured to balance the requirement of adhesion and toughness. Further, the present disclosure provides a unique method of application for a non-line of sight coating without losing density and while also providing a uniform density across the coating. In addition, the localized low temperature curing is configured to protect underlying layers and the remaining component from additional heat treatment.

Thus, in an embodiment, the material composition of the present disclosure provides the technical effect of providing a chemistry formulation that can be cured at lower temperatures by incorporating sintering additives such as low melting glass. In such embodiments, the low melting glass is configured to convert to crystalline phases during processing, so the toughness of the ceramic-based top layer is restored. In particular embodiments, the material composition of the present disclosure is configured to provide an adhesion pull strength of greater than about four (4) megapascals (MPa) (about 600 pounds per square inch (PSI)). Moreover, in an embodiment, the material composition of the present disclosure may have a density that matches (e.g., by at least 70%) remaining portions of the ceramic-based top layer. In addition, in an embodiment, the material composition of the present disclosure may provide erosion resistance of at least 70% of the original component.

Still further benefits are provided with the material composition of the present disclosure. For example, in an embodiment, there is minimal (or no) debit in shot peening compressive stress in the underlying layers. Moreover, the material composition of the present disclosure can repair damage location, while also providing a smooth surface. In addition, localized heating prevents rest of the component undergoing heat treatment.

Figure 2:
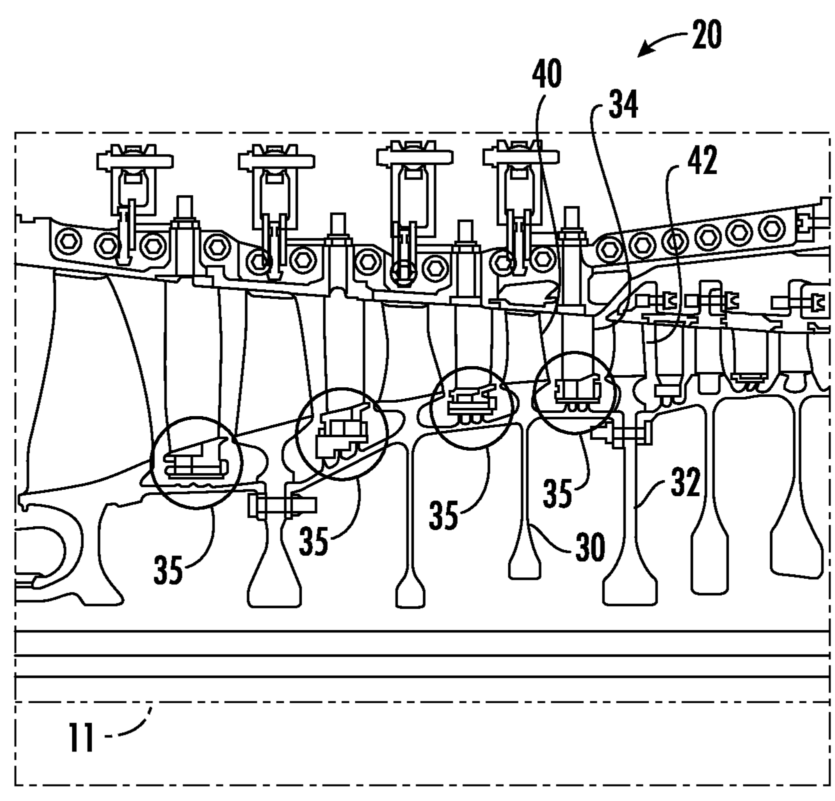
FIG. 2 is a detailed view of a compressor of the gas turbine engine of FIG. 1, particularly illustrating example seal locations according to the present disclosure.
Figure 3:
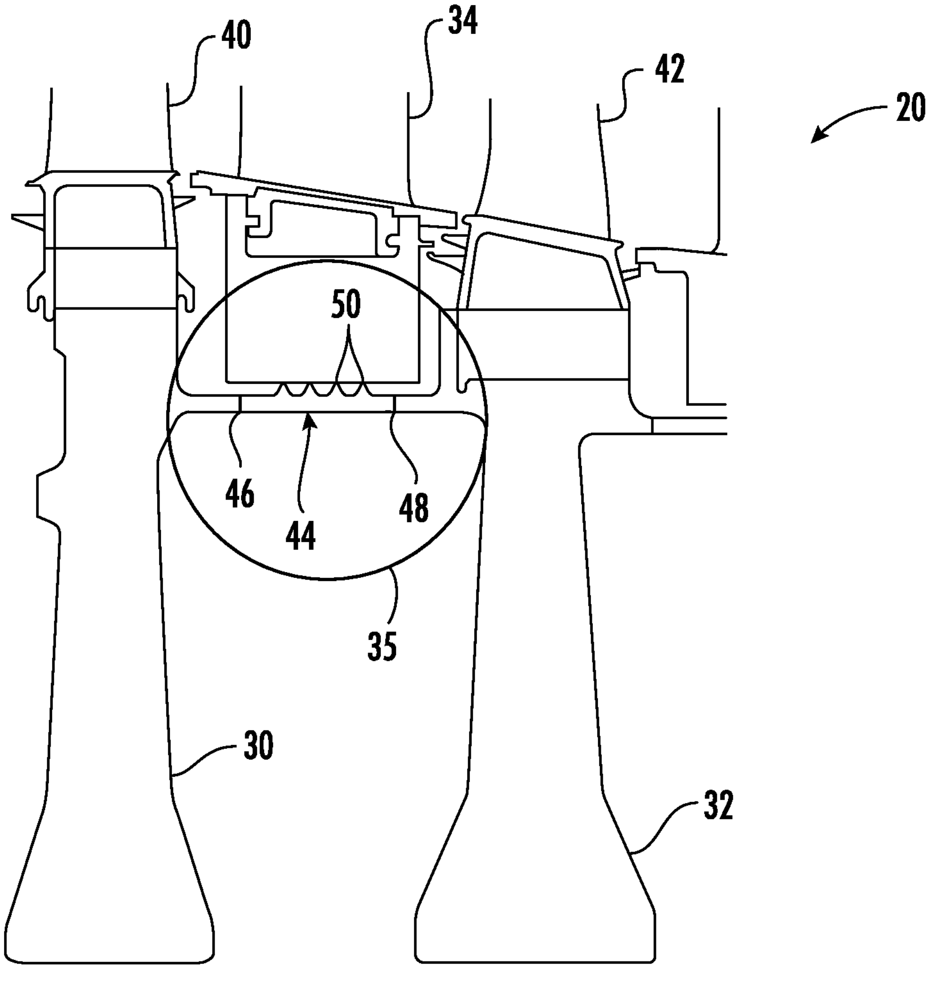
FIG. 3 is a partial, simplified view of the compressor of the gas turbine engine of FIG. 2.

Referring now to the drawings, wherein identical numerals indicate the same elements throughout the figures, FIGS. 1-3 illustrate various views of a gas turbine engine 10, also referred to herein as the engine 10, which can incorporate various aspects of the disclosed technology. In particular, FIG. 1 illustrates a partial, schematic view of an embodiment of the gas turbine engine 10 which can incorporate various aspects of the disclosed technology, whereas FIG. 2 illustrates a detailed view of an embodiment of a compressor of the gas turbine engine of FIG. 1, particularly illustrating example seal locations 35 according to the present disclosure. FIG. 3 illustrates a partial, simplified view of the compressor of the gas turbine engine of FIG. 2, particularly illustrating one of the seal locations 35 according to the present disclosure.

As shown, the gas turbine engine 10 has a longitudinal axis 11 and includes a fan 12, a low pressure compressor ("LPC) or "booster" 14 and a low pressure turbine ("LPT") 16 collectively referred to as a "low pressure system." The LPT 16 drives the fan 12 and the booster 14 through an inner shaft 18, also referred to as an "LP shaft." The engine 10 also includes a high pressure compressor ("HPC") 20, a combustor 22, and a high pressure turbine ("HPT") 24, collectively referred to as a "gas generator" or "core." The HPT 24 drives the HPC 20 through an outer shaft 26, also referred to as an "HP shaft." Together, the high and low pressure systems are operable in a known manner to generate a primary or core flow as well as a fan flow or bypass flow. The inner and outer shafts 18 and 26 are mounted for rotation in several rolling-element bearings. The bearings are located in enclosed portions of the engine 10 referred to as "sumps."

While the illustrated gas turbine engine 10 is a high-bypass turbofan engine, the disclosed technology can be equally applicable to turboprop, turbojet, and turboshaft engines, as well as turbine engines used for other vehicles or in stationary applications. It should also be appreciated that the turbine engines incorporating the present disclosure can be employed for use in a variety of applications, including turbine engines in aircraft.

Referring particularly to FIGS. 2 and 3, the HPC 20 may include any number of rotor disks 30, 32 coupled to the HP shaft 26, two of which are labeled and generally referred to herein as a first rotor disk 30 and a second rotor disk 32 shown. Further, as shown, the rotor disks 30, 32 are axially spaced from one another at a predetermined distance. Moreover, each of the rotor disks 30, 32 supports a plurality of compressor blades, with a first compressor blade 40 and a second compressor blade 42, respectively, being shown. A stator 34 or a similar fixed structure may extend between the compressor blades 40, 42 and portions of the disks 30, 32.

Referring particularly to FIG. 3, an example seal location 35 of the HPC 20 may include a seal ring 44 as described herein. The seal ring 44 may be attached to the first rotor disk 30 at a first end 46 thereof and to the second rotor disk 32 at a second end 48 thereof. Further, as shown, the seal ring 44 may include a seal body (e.g., a main ring portion) having any number of seal teeth 50 or similar types of seals extending therefrom. The seal teeth 50 may be positioned so as to face the stator 34. Any number of seal teeth 50 may be used. The seal teeth 50 may have any desired size or shape. In use, the seal ring 44 adequately prevents leakage via the use of the seal teeth 50. The seal ring 44 itself also transmits torque therethrough. Further, the seal ring 44 may be used between any type of rotating parts, such as between stages of the LPC 14, the HPT 24, and the LPT 16.

Figure 4:
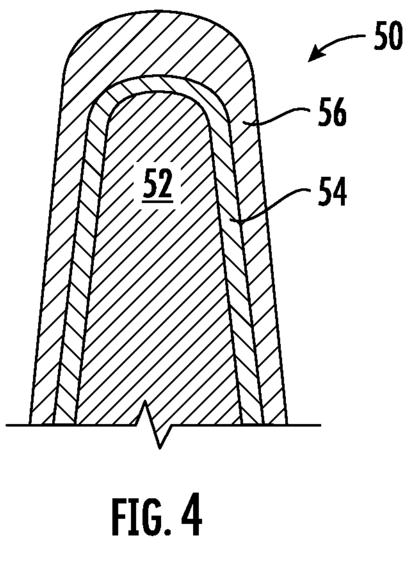
FIG. 4 is a detailed view of an embodiment of a seal tooth according to the present disclosure.

Referring now to FIG. 4, a detailed view of an embodiment of one of the seal teeth 50 is illustrated according to the present disclosure. As shown, the illustrated seal tooth 50 is constructed of three layers. In particular embodiments, as shown, the seal tooth 50 includes a base layer 52, an intermediate layer 54, and a ceramic-based top layer 56. In an embodiment, the base layer 52 may be a nickel-based alloy or a titanium-based alloy. The intermediate layer 54 is typically a nickel-aluminide bond coat layer. The ceramic-based top layer 56 is commonly made of an alumina-based alloy. For certain seal teeth, the intermediate and ceramic-based top layers 54, 56 may be deposited onto the base layer 52 using any suitable applications methods, such as via atmospheric plasma spraying (APS), additive manufacturing, etc.

Figure 5:
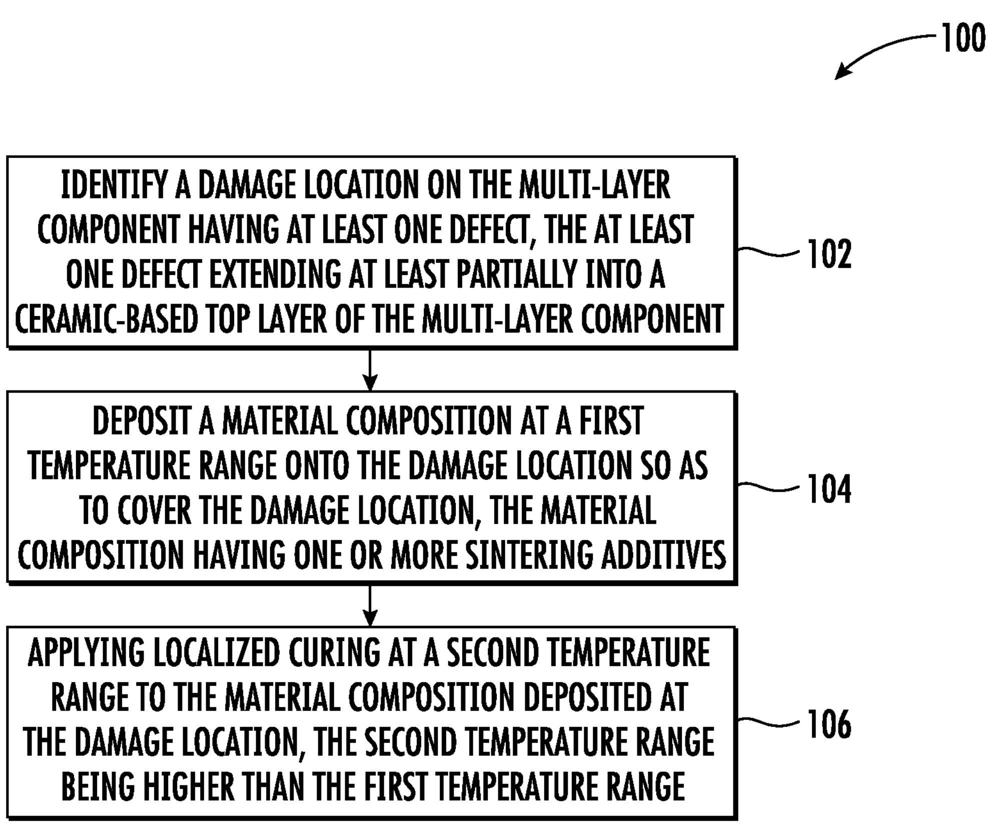
FIG. 5 is a flow diagram of an embodiment of a method of repairing a multi-layer component of an engine according to the present disclosure.
Figures 6A, 6B, 6C, 6D, 6E:
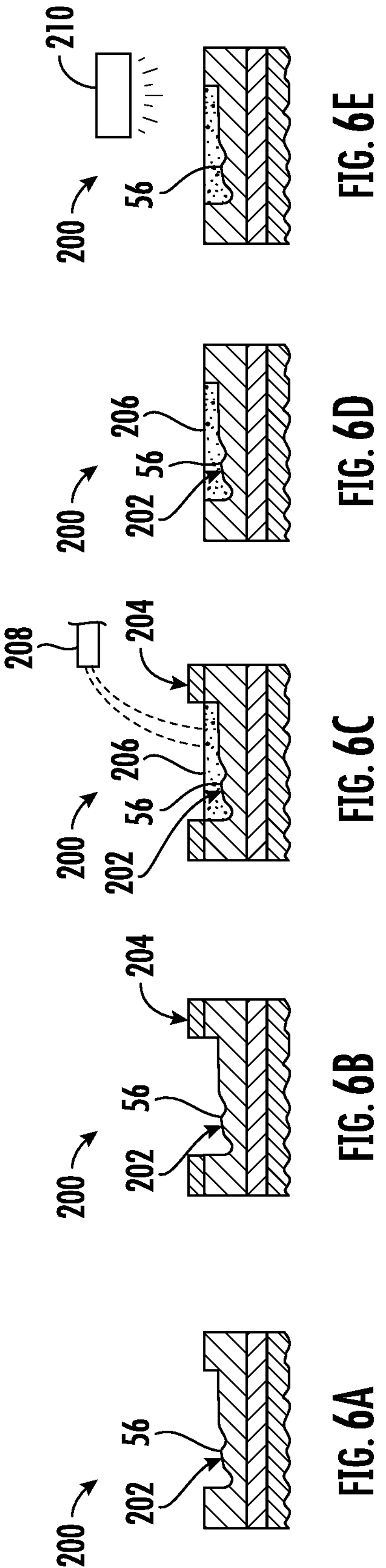
FIGS. 6A-6E are schematic diagrams of a sequence of operations of an embodiment of a system for repairing a multi-layer component of an engine.

Referring now to FIGS. 5 and 6, a method 100 and a system 200 for repairing a multi-layer component of an engine, such as the seal teeth 50 described herein are illustrated, respectively. More specifically, FIG. 5 illustrates a flow diagram of an embodiment of the method 100 of repairing a multi-layer component of an engine according to the present disclosure, whereas FIGS. 6A-6B illustrates schematic diagrams of an embodiment of the system 200 for repairing a multi-layer component of an engine. In addition, the method 100 described herein can be used to repair the seal teeth 50 in-module, i.e., without dismantling the gas turbine engine 10.

The method 100 described herein is generally explained with reference to the gas turbine engine 10 and components thereof illustrated in FIGS. 1-4. However, it should be understood that the method 100 can be applied to any multi-layer component of an engine having any suitable configuration. Furthermore, it should be appreciated that the method 100 is discussed herein only to describe aspects of the present disclosure and is not intended to be limiting. Further, though FIG. 5 depicts the method 100 having steps performed in a particular order for purposes of illustration and discussion, those of ordinary skill in the art, using the disclosures provided herein, will understand that the steps of any of the methods discussed herein can be adapted, rearranged, expanded, omitted, or modified in various ways without deviating from the scope of the present disclosure.

Referring particularly to FIG. 5, as shown at (102), the method 100 includes identifying a damage location on the multi-layer component having at least one defect, the at least one defect extending at least partially into a ceramic-based top layer of the multi-layer component. Identifying the damage location because completed, for example, manually or via an imaging device or sensor. As shown at (104), the method 100 includes depositing a material composition at a first temperature range onto the damage location so as to cover the damage location, the material composition having one or more sintering additives. For example, in an embodiment, the first temperature range may include temperatures ranging from about 15° C. to about 40° C., such as room temperature. As shown at (106), the method 100 includes applying localized curing at a second temperature range to the material composition deposited at the damage location, the second temperature range being higher than the first temperature range. In particular embodiments, the second temperature range may include temperatures ranging from about 300° C. to about 900° C.

Embodiments of the system 200 and method 100 of the present disclosure can be better understood with reference to FIGS. 6A-6E. In particular, as shown in FIG. 6A, a damage location 202 having a defect extending at least partially into the ceramic-based top layer 56 indicating field distress, such as spallation, is identified. It should be understood that the defect(s) described herein may be any defect, distress, crack, fracture, feature, hole, recess, groove, feature, etc. As shown in FIG. 6B, the method 100 includes positioning a protective layer 204, such as a film or mask layer, around the damage location 202, e.g., to protect a surrounding area of the damage location 202. As shown in FIG. 6C, the method 100 includes depositing a material composition 206 on the damage location 202 at the first temperature range, e.g., using spackling or slurry spraying. For example, in an embodiment, as shown, the system 200 may include an application device 208 for depositing the material composition 206 at the damage location 202. More specifically, in an embodiment, the application device 208 may be a spackling applicator, a slurry sprayer, or any other suitable application device.

Furthermore, the material composition 206 described herein includes, at least, one or more sintering additives and one or more nucleating agents. For example, in an embodiment, the sintering additive(s) may be low melting glass, thermoset polymers pyrolyzed to ceramic, and/or organometallic precursor derived gel. Accordingly, the sintering additive(s) is configured to convert into crystalline phases during processing to restore toughness of the ceramic-based top layer of the multi-layer component after repair, whereas and the nucleating agent is configured to convert the sintering additive(s) to a ceramic material to reduce brittleness. Accordingly, the material composition 206 can be particularly useful in repairing the ceramic-based top layer 56 of the seal tooth 50 at an in-module level. In an embodiment, the material composition 206 may be a slurry composition that can be applied to the damage location 202 of the alumina-based ceramic-based top layer 56 of a damaged seal tooth, such that the seal tooth can be repaired via sintering at lower temperatures.

As used herein, low melting glass can be SiO2 based, or non-silica based such as P2O5 based. In such instances, these two families can be represented by M-SiO2 and N—P2O5. Thus, in an embodiment, M includes SrO, ZnO, BaO, $La_2O_3$, $Al_2O_3$, $B_2O_3$, ZnO, $Bi_2O_3$, etc. or their combination. Further, in an embodiment, N includes CaO, $Na_2O$, ZnO and $Fe_2O_3$ etc., or their combination. In addition, examples of nucleating agents are $V_2O_5$, $Cr_2O_3$, $Ba_3(PO_4)_2$, $TiO_2$ and $Fe_2O_3$.

Referring to FIG. 6D, the method 100 includes removing the protective layer 204 after depositing the material composition 206 at the damage location 202. Furthermore, as shown in FIG. 6E, the method 100 includes applying localized curing to the material composition 206 deposited at the damage location at a second temperature range. For example, as shown, the curing may be completed using any suitable heat source 210 such as a heater, a heat exchanger, heated air, a heated light, etc. Moreover, in certain embodiments, after applying the localized curing to the material composition 206 deposited at the damage location 202 at the second temperature range, the multi-layer component 206 has a uniform density across the multi-layer component (i.e., from one side of the damage location 202 to the other).

Further aspects are provided by the subject matter of the following clauses:

A method of repairing a multi-layer component of an engine in-module, the method comprising: identifying a damage location on the multi-layer component having at least one defect, the at least one defect extending at least partially into a ceramic-based top layer of the multi-layer component; depositing a material composition at a first temperature range onto the damage location so as to cover the damage location, the material composition comprising one or more sintering additives; and applying localized curing at a second temperature range to the material composition deposited at the damage location, the second temperature range being higher than the first temperature range.

The method of any preceding clause, wherein the material composition further comprises a nucleating agent.

The method of any preceding clause, further comprising positioning a protective layer around the damage location before depositing the material composition onto the damage location at the first temperature range.

The method of any preceding clause, further comprising removing the protective layer from around the damage location after depositing the material composition onto the damage location.

The method of any preceding clause, wherein the one or more sintering additives comprise low melting glass.

The method of any preceding clause, wherein depositing the material composition into the damage location at the first temperature range further comprises at least one of spackling or slurry spraying.

The method of any preceding clause, wherein, after applying the localized curing to the material composition deposited at the damage location at the second temperature range, the multi-layer component comprises a uniform density across the multi-layer component.

The method of any preceding clause, wherein the first temperature range comprises temperatures ranging from about 15 degrees Celsius (C) to about 30° C.

The method of any preceding clause, wherein the second temperature range comprises temperatures equal to or less than about 650 degrees Celsius (° C.).

The method of any preceding clause, wherein the ceramic-based top layer is constructed of an alumina-based alloy.

The method of any preceding clause, wherein the multi-layer component of the engine comprises one or more seal teeth of a seal of the engine.

A system for repairing a ceramic-based top layer of a multi-layer component of an engine in-module, the system comprising: a material composition for covering a defect in the ceramic-based top layer, the material composition comprising a sintering additive and a nucleating agent; and a heat source for applying localized heat to the material composition at the damage location to cure the material composition, wherein the sintering additive converts crystalline phases during processing to restore toughness of the ceramic-based top layer of the multi-layer component after repair, and wherein the nucleating agent converts the sintering additive to a ceramic material to reduce brittleness at the multi-layer component after repair.

The system of any preceding clause, further comprising a protective layer for protecting a surrounding area of the damage location.

The system of any preceding clause, wherein the sintering additive comprises low melting glass.

The system of any preceding clause, further comprising an application device for depositing the material composition onto the damage location at a first temperature range.

The system of any preceding clause, wherein the application device comprises at least one of a spackling applicator or a slurry sprayer.

The system of any preceding clause, wherein the first temperature range comprises temperatures ranging from about 15 degrees Celsius (C) to about 30° C., and wherein the heat source applies the localized heat to the material composition at a second temperature range, the second temperature range comprising temperatures equal to or less than about 650 degrees Celsius (° C.).

The system of any preceding clause, wherein the multi-layer component comprises a uniform density across the material composition after repairing and curing.

The system of any preceding clause, wherein the ceramic-based top layer is constructed of an alumina-based alloy.

The system of any preceding clause, wherein the multi-layer component of the engine comprises one or more seal teeth of a seal of the engine.

This written description uses examples to disclose the present technology, including the best mode, and also to enable any person skilled in the art to practice the present technology, including making and using any devices or systems and performing any incorporated methods. The patentable scope of the present technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of repairing a multi-layer component of an engine in-module, the method comprising:

identifying a damage location on the multi-layer component having at least one defect, the at least one defect extending at least partially into a ceramic-based top layer of the multi-layer component, wherein the multi-layer component comprises one or more seal teeth of a seal of the engine;

depositing a material composition at a first temperature range onto the damage location so as to cover the damage location, the material composition comprising one or more sintering additives and a nucleating agent; and applying localized curing via a heat source at a second temperature range to the material composition deposited at the damage location, the second temperature range being higher than the first temperature range, wherein the second temperature range comprises temperatures equal to or less than about 650 degrees Celsius (° C.), further wherein the heat source comprises a heater, a heat exchanger, or a heated light.

2. The method of claim 1, further comprising positioning a protective layer around the damage location before depositing the material composition onto the damage location at the first temperature range.

3. The method of claim 2, further comprising removing the protective layer from around the damage location after depositing the material composition onto the damage location.

4. The method of claim 1, wherein the one or more sintering additives comprise low melting glass.

5. The method of claim 1, wherein depositing the material composition onto the damage location at the first temperature range further comprises at least one of spackling or slurry spraying.

6. The method of claim 1, wherein, after applying the localized curing to the material composition deposited at the damage location at the second temperature range, the multi-layer component comprises a uniform density across the multi-layer component.

7. The method of claim 1, wherein the first temperature range comprises temperatures ranging from about 15 degrees Celsius (° C.) to about 30° C.

8. The method of claim 1, wherein the ceramic-based top layer is constructed of an alumina-based alloy.

* * * * *